(12) United States Patent
Song

(10) Patent No.: US 11,607,934 B1
(45) Date of Patent: Mar. 21, 2023

(54) DOOR MOUNTING UNIT FOR VEHICLE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/545,138

(22) Filed: Dec. 8, 2021

(30) Foreign Application Priority Data

Aug. 24, 2021 (KR) .......................... 10-2021-0111636

(51) Int. Cl.
*B60J 5/04* (2006.01)
*B62D 25/04* (2006.01)

(52) U.S. Cl.
CPC ............ *B60J 5/0468* (2013.01); *B62D 25/04* (2013.01)

(58) Field of Classification Search
CPC .......... B60J 5/047; B60J 5/0468; B62D 25/04
USPC .............................. 296/146.4, 146.11, 146.12
See application file for complete search history.

(56) References Cited

U.S. PATENT DOCUMENTS

| 6,213,535 | B1 * | 4/2001 | Landmesser | B60J 5/06 296/146.12 |
| 6,305,737 | B1 * | 10/2001 | Corder | E05F 15/63 296/146.12 |
| 7,150,492 | B2 * | 12/2006 | Nania | E05D 3/127 16/334 |
| RE41,143 | E * | 2/2010 | Rangnekar | E05D 3/127 16/366 |
| 9,890,576 | B2 * | 2/2018 | Elie | B60R 16/03 |
| 2021/0062566 | A1 * | 3/2021 | Bakos | B60J 5/047 |

* cited by examiner

*Primary Examiner* — Dennis H Pedder
(74) *Attorney, Agent, or Firm* — Slater Matsil, LLP

(57) ABSTRACT

An embodiment door mounting unit for a vehicle includes a body hinge shaft and first mounting portions disposed at both ends of the body hinge shaft, wherein the body hinge shaft is configured to be elongated in a door opening of a vehicle body along a pillar in a height direction of the vehicle body and is configured to be mounted on the vehicle body by the first mounting portions.

20 Claims, 6 Drawing Sheets

DOOR MOUNTING UNIT FOR VEHICLE

CROSS-REFERENCE TO RELATED APPLICATIONS

This application claims the benefit of Korean Patent Application No. 10-2021-0111636, filed on Aug. 24, 2021, which application is hereby incorporated herein by reference.

TECHNICAL FIELD

The present invention relates to a door mounting unit for a vehicle.

BACKGROUND

Recently, the vehicle industry is introducing a new concept of future mobility vision for realizing a human-centered dynamic future city.

One of these future mobility solutions is a purpose built vehicle (PBV) as a purpose built mobility.

The PBV is an eco-friendly mobility solution that provides customized services needed for passengers during the time they travel to their destination and may also set the optimal route for each situation and perform platooning by using artificial intelligence while based on an electric vehicle.

The body of the PBV includes an under body (also referred to as a rolling chassis or skateboard in the art) and an upper body mounted on an upper portion of the under body.

A battery module, etc. is mounted on the under body.

And the upper body includes a space frame which constitutes a framework by welding a steel plate or a pipe.

Such an upper body is mounted to the under body by a cabin portion.

Also, in many cases, the interior of the vehicle in the PBV is changed to suit the purpose.

For example, when a PBV according to the conventional art moves outdoors to enjoy leisure activities, an indoor space of the PBV is remodeled and applied so as to provide various conveniences.

At this time, even though the PBV according to the conventional art has its interior space remodeled to suit the purpose, the existing door is inferior in getting on and off the PBV, which causes spatial restrictions to occur.

Accordingly, the PBV according to the conventional art needs to research and develop a door technology that is economical and simply designable in order to utilize the interior space to the maximum.

The above information disclosed in this Background section is only for enhancement of understanding of the background of the invention, and therefore it may contain information that does not form the prior art that is already known to a person of ordinary skill in the art.

SUMMARY

The present invention relates to a door mounting unit for a vehicle. Particular embodiments relate to a door mounting unit for a vehicle capable of providing convenience in getting on and off the vehicle while securing rigidity of a vehicle body.

Embodiments of the present invention provide a door mounting unit for a vehicle having advantages of improving rigidity of a vehicle body by applying a structure of a body hinge shaft disposed in a height direction of the vehicle body along a front pillar and a rear pillar.

Another embodiment of the present invention provides a door mounting unit for a vehicle applied to a door opening portion formed in a vehicle body to mount a door to the vehicle body in the vehicle used for multiple purposes including a body hinge shaft elongated in the door opening portion along a pillar in a height direction of the vehicle body and mounted on the vehicle body by first mounting portions configured at both ends.

The body hinge shaft may be disposed on a front side of the door opening portion with respect to an open direction in which the door is opened.

The first mounting portion may include an upper body bracket fitted into an upper end of the body hinge shaft, mounted on the vehicle body, and rotatably supporting the body hinge shaft, and a lower body bracket fitted into a lower end of the body hinge shaft, mounted on the vehicle body, and rotatably supporting the body hinge shaft together with the upper body bracket.

The upper body bracket may include a cap portion fitted into the body hinge shaft and a plate portion integrally formed and extending from the cap portion toward the vehicle body and mounted on an upper edge side of the vehicle body.

One side of the plate portion integrally formed and extending from the cap portion may be mounted on a roof rail module, and the other end integrally formed and extending from the cap portion may be mounted on a roof rail side.

The lower body bracket may be fastened to a side inner panel overlapping a side outer panel to form a closed cross-section, and a pillar inner joint overlapping the side inner panel.

The door mounting unit for the vehicle may further include a door hinge shaft disposed at a position spaced apart from the body hinge shaft by a predetermined distance and mounted to the door in a height direction of the vehicle body by a second mounting portion so as to be parallel to the body hinge shaft.

The door mounting unit for the vehicle may further include a pair of gooseneck hinges respectively mounted on upper and lower portions of the body hinge shaft and the door hinge shaft in a longitudinal direction of the vehicle body and connecting the body hinge shaft and the door hinge shaft to open and close the door.

The second mounting portion may include an upper door bracket connected to the gooseneck hinge positioned on an upper portion of the door hinge shaft and mounted on the door and a lower door bracket connected to the gooseneck hinge positioned on a lower portion of the door hinge shaft and mounted on the door.

A pair of the gooseneck hinges may be formed in a convexly rounded shape toward an inside of a vehicle compartment.

The door mounting unit for the vehicle may further include a drive motor mounted on the body hinge shaft to selectively rotate the body hinge shaft and open and close the door.

The drive motor may be connected to the lower body bracket.

The door mounting unit for the vehicle according to an exemplary embodiment of the present invention may improve performance of a framework against ceiling strength, side collision ability, torsion rigidity, etc. through a structure of a body hinge shaft disposed in a height direction of the vehicle body along the front pillar and the rear pillar.

In addition, the door mounting unit for the vehicle according to an exemplary embodiment of the present invention may prevent a user's head from contacting the door mounting unit in advance due to a structure of a gooseneck hinge upon getting on and off the vehicle, and thus there is also the effect of preventing safety accidents, and improving convenience and marketability.

In addition, the effects obtainable or predicted from an exemplary embodiment of the present invention are to be disclosed directly or implicitly in the detailed description of the exemplary embodiment of the present invention. That is, various effects predicted according to exemplary embodiments of the present invention will be disclosed in the detailed description to be described later.

Figure 1:
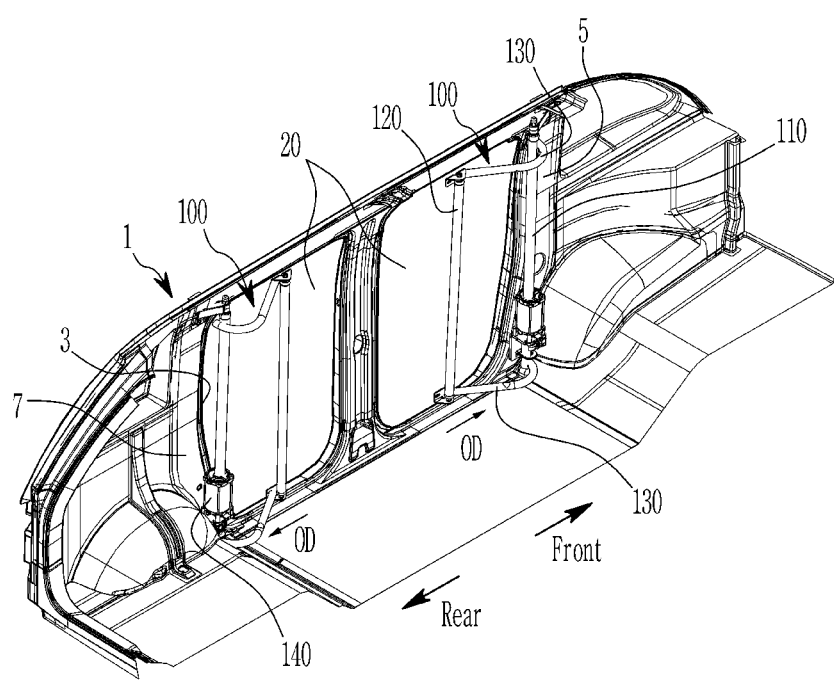
FIG. 1 is a configuration diagram of a vehicle to which a door mounting unit for the vehicle according to an exemplary embodiment of the present invention is applied viewed from the interior.

The following elements may be used in connection with the drawings to describe embodiments of the present invention.

1: vehicle body
3: door opening portion
5: front pillar
7: rear pillar
9: roof panel
10: roof rail module
10a: roof rail
10b: roof rail extension
11: roof rail side
13: side outer panel
15: side inner panel
17: pillar inner joint
19: upper edge
20: door
100: door mounting unit
110: body hinge shaft
111: first mounting portion
113: upper body bracket
113a: cap portion
113b: plate portion
115: lower body bracket
120: door hinge shaft
121: second mounting portion
123: upper door bracket
125: lower door bracket
130: gooseneck hinge
140: drive motor

DETAILED DESCRIPTION OF ILLUSTRATIVE EMBODIMENTS

Exemplary embodiments of the present invention will hereinafter be described in detail with reference to the accompanying drawings.

The embodiments described in the present specification and the configurations shown in the drawings are only the most preferred embodiments of the present invention, and do not represent all of the technical spirit of the present invention, and thus it should be understood that they may be substituted with various equivalents and modifications at the time of filing the present application.

In order to clearly explain embodiments of the present invention, parts irrelevant to the description are omitted, and like reference numerals designate like elements throughout the specification.

Since the size and thickness of each configuration shown in the drawings are arbitrarily indicated for convenience of description, embodiments of the present invention are not necessarily limited to those shown in the drawings, and the thickness is enlarged to clearly express various parts and regions.

In addition, throughout the specification, unless explicitly described to the contrary, the word "comprise", and variations such as "comprises" or "comprising", will be understood to imply the inclusion of stated elements but not the exclusion of any other elements.

In addition, terms such as " . . . unit", " . . . means", " . . . portion", " . . . member" described in the specification refer to a unit of a comprehensive configuration that performs at least one function or operation.

Figure 2:
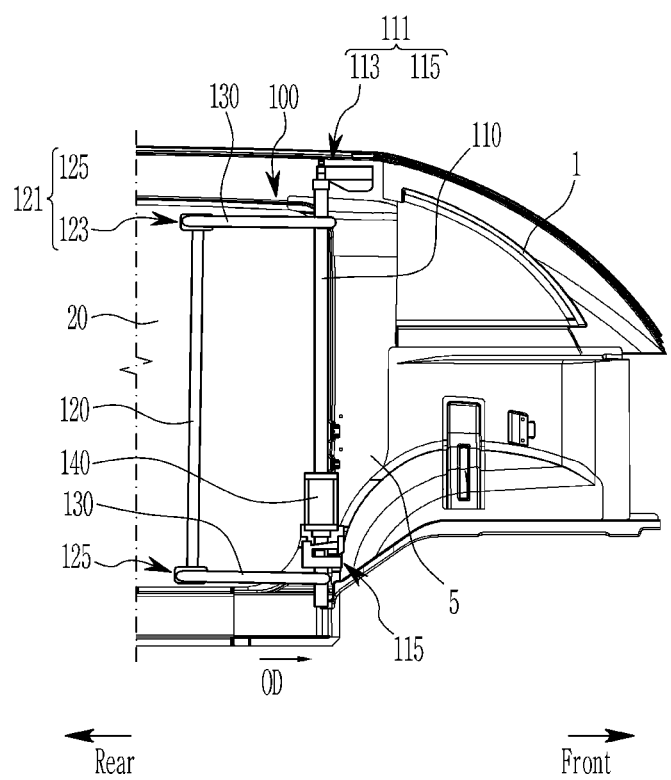
FIG. 2 is an enlarged view of one side of the vehicle to which the door mounting unit for the vehicle according to an exemplary embodiment of the present invention is applied.

FIG. 1 is a configuration diagram of a vehicle to which a door mounting unit for the vehicle according to an exemplary embodiment of the present invention is applied viewed from the interior, and FIG. 2 is an enlarged view of one side of the vehicle to which the door mounting unit for the vehicle according to an exemplary embodiment of the present invention is applied.

Referring to FIG. 1, a door mounting unit 100 for the vehicle according to an exemplary embodiment of the present invention may be applied to a door opening portion 3 formed in a vehicle body 1 to mount a door 20.

The door opening portion 3 means an open portion of the vehicle body 1 so that the door 20 is disposed.

In addition, the door mounting unit 100 for the vehicle may be applied to the vehicle body 1 manufactured for various purposes.

The vehicle body 1 for multi-purpose may be a vehicle designed to selectively perform two or more purposes, such as passenger transport or cargo transport.

In addition, the vehicle body 1 may be used for various purposes such as riding, leisure, sports, etc.

Such a vehicle body 1 requires a high overall height in order to secure an interior space.

In addition, a separate door structure may be applied to the vehicle body 1 to utilize the interior space having the high overall height.

The door mounting unit 100 for the vehicle according to an exemplary embodiment of the present invention that is applied to the vehicle body 1 including two door opening portions 3 is described as an example.

In the specification, the 'longitudinal direction of vehicle body' may be defined as a front and rear direction of the vehicle body and the 'width direction of vehicle' may be defined as a left and right direction of the vehicle body.

Furthermore, in the specification, the term 'upper end portion', 'upper portion', 'upper end' or 'upper surface' of a constituent element indicates an end portion, part, end, or surface of the constituent element that is in a relatively upper side in the drawing, and the term 'lower end portion', 'lower portion', 'lower end' or 'lower surface' of a constituent element indicates an end portion, part, end, or surface of the constituent element that is in a relatively lower side in the drawing.

Furthermore, in the present specification, an end (e.g., one end or the other end, etc.) of a constituent element indicates a tip of the constituent element in any one direction, and an end portion (e.g., one end portion or the other end portion, etc.) of the constituent element indicates a certain part of the constituent element including its tip.

Referring to FIG. 2, the door mounting unit 100 for the vehicle includes a body hinge shaft no, a door hinge shaft 120, a gooseneck hinge 130, and a drive motor 140.

First, the body hinge shaft no is elongated in a height direction of the vehicle body 1 along a front pillar 5 or a rear pillar 7 in the door opening portion 3.

The body hinge shaft no may be disposed at a boundary of the door opening portion 3 with respect to the longitudinal direction of the vehicle body 1.

In the present embodiment, the door opening portion 3 may be formed in the longitudinal direction of the vehicle body 1, and may be divided into front and rear by a structure such as a B pillar. Accordingly, the doors 20 may be provided at the front and rear of the vehicle, respectively.

In more detail, the body hinge shafts no may be disposed at the front or rear of the door opening portion 3, respectively, in correspondence to respective opening directions (hereinafter referred to as 'OD') of the doors 20.

For example, in the case of the door opening portion 3 located in the front of the vehicle body 1, the body hinge shaft no may be disposed at a front side boundary of the door opening portion 3 with respect to the longitudinal direction of the vehicle body 1.

Also, in the case of the door opening portion 3 located in the rear of the vehicle body 1, the body hinge shaft no may be disposed at a rear side boundary of the door opening portion 3 with respect to the longitudinal direction of the vehicle body 1.

That is, the door 20 disposed in the front of the vehicle body 1 in the door opening portion 3 may be opened toward the front of the vehicle. In addition, the door 20 disposed in the rear of the vehicle body 1 in the door opening portion 3 may be opened toward the rear of the vehicle.

Accordingly, the body hinge shaft no corresponding to the door 20 in the front of the vehicle body 1 may be disposed in the front boundary of the door opening portion 3 in accordance with the OD of the door 20 facing the front of the vehicle body 1.

Also, the body hinge shaft no corresponding to the door 20 in the rear of the vehicle body 1 may be disposed in the rear boundary of the door opening portion 3 in accordance with the OD of the door 20 facing the rear of the vehicle body 1.

The body hinge shaft no may be disposed to correspond to the front pillar 5 or the rear pillar 7.

That is, the body hinge shaft no may improve rigidity of the front pillar 5 or the rear pillar 7 by forming a double pillar structure together with the front pillar 5 or the rear pillar 7.

The body hinge shaft no is mounted to the vehicle body 1 by first mounting portions 111 configured at both ends of the vehicle body 1 in the height direction.

Here, the first mounting portion 111 includes an upper body bracket 113 and a lower body bracket 115.

Figure 3:
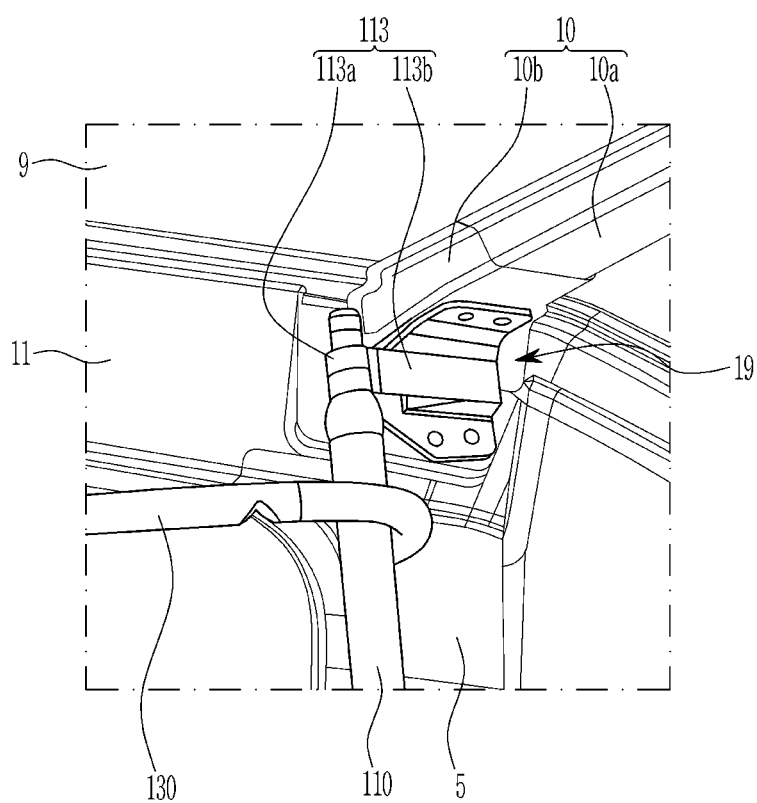
FIG. 3 is an enlarged view of an upper body bracket applied to a door mounting unit for a vehicle according to an exemplary embodiment of the present invention.

FIG. 3 is an enlarged view of an upper body bracket applied to a door mounting unit for a vehicle according to an exemplary embodiment of the present invention.

Referring to FIG. 3, the upper body bracket 113 is mounted on the vehicle body 1 while being fitted into an upper end of the body hinge shaft no.

The upper body bracket 113 includes a cap portion 113a fitted into the body hinge shaft no.

Here, a plate portion 113b is integrally formed to extend from the cap portion 113a toward the vehicle body 1.

The plate portion 113b is mounted on an upper edge 19 of the vehicle body 1.

One side of the plate portion 113b integrally formed and extending from the cap portion 113a is mounted on a roof rail module 10, and the other side integrally formed and extending from the cap portion 113a is mounted on a roof rail side 11.

Here, the roof rail module 10 may include a roof rail boa mounted on a roof panel 9 of the vehicle in a width direction of the vehicle.

In addition, the roof rail module 10 may include a roof rail extension 10b mounted to overlap the roof rail boa.

Figure 4:
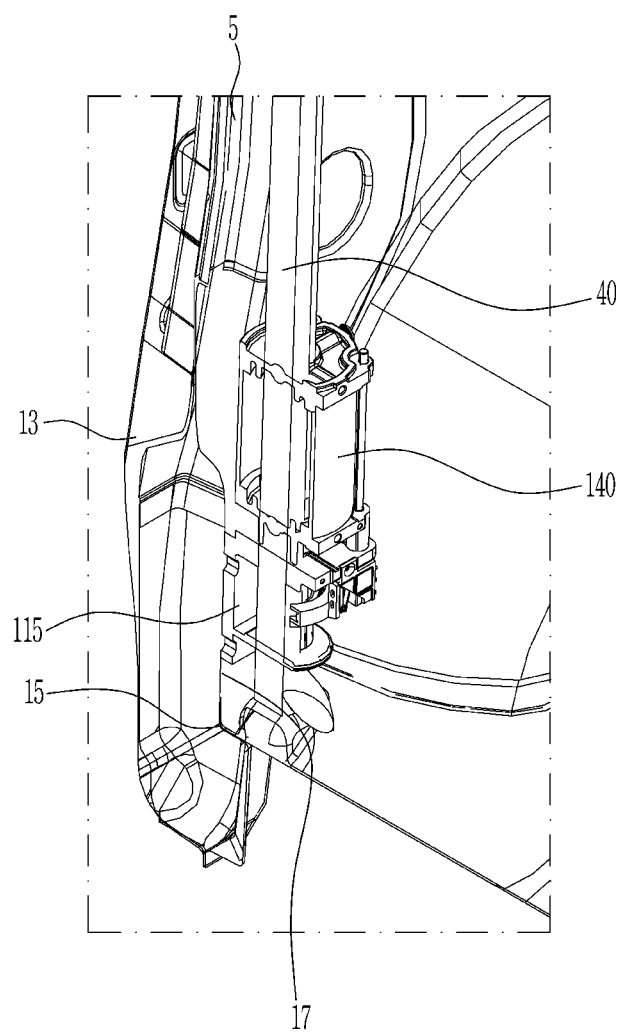
FIGS. 4 and 5 are enlarged views of a lower body bracket applied to a door mounting unit for a vehicle according to an exemplary embodiment of the present invention.
Figure 5:
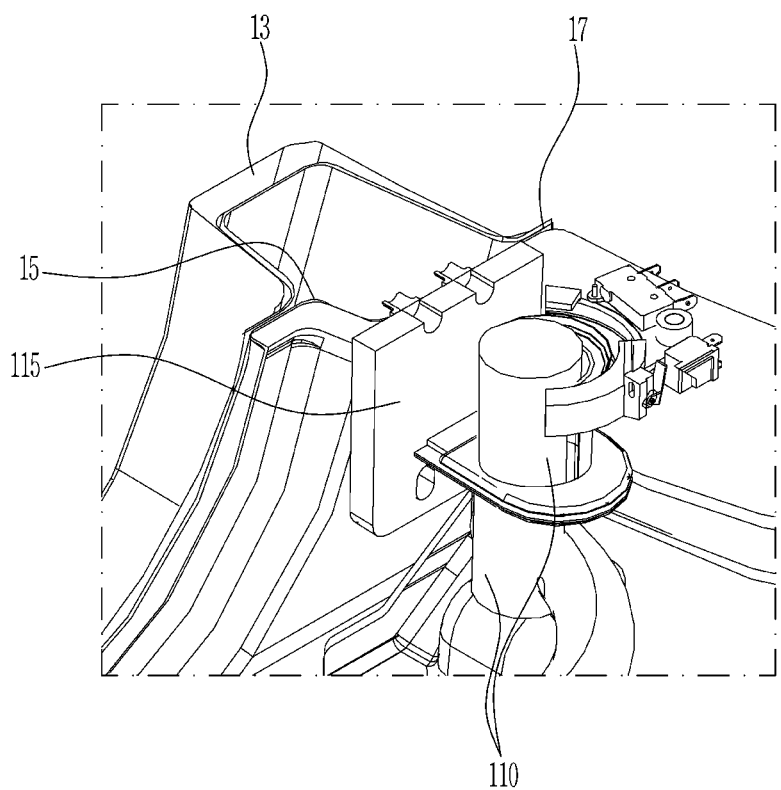

FIGS. 4 and 5 are enlarged views of a lower body bracket applied to a door mounting unit for a vehicle according to an exemplary embodiment of the present invention.

Referring to FIGS. 4 and 5, the lower body bracket 115 is mounted to the vehicle body 1 while being fitted into a lower end of the body hinge shaft no.

The lower body bracket 115 rotatably supports the body hinge shaft no together with the upper body bracket 113.

The lower body bracket 115 may be fastened to a side inner panel 15 overlapping a side outer panel 13 to form a closed cross-section, and a pillar inner joint 17 overlapping the side inner panel 15.

Figure 6:
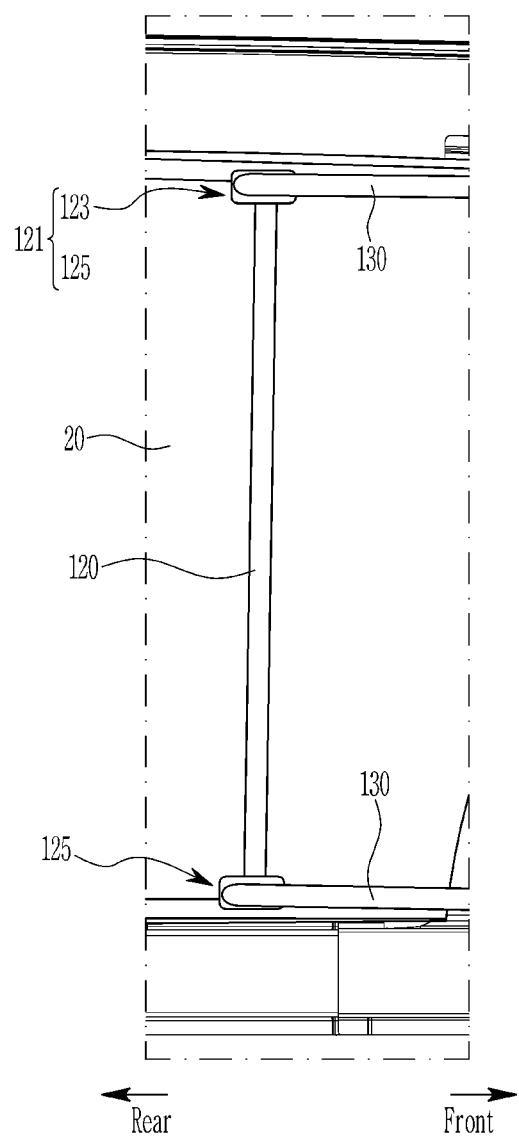
FIG. 6 is an enlarged view of a second mounting unit applied to a door mounting unit for a vehicle according to an exemplary embodiment of the present invention.

FIG. 6 is an enlarged view of a second mounting portion applied to a door mounting unit for a vehicle according to an exemplary embodiment of the present invention.

Referring to FIG. 6, the door hinge shaft 120 is disposed at a position spaced apart from the body hinge shaft no by a predetermined distance.

The door hinge shaft 120 is mounted to the door 20 in a height direction of the vehicle body 1 by a second mounting portion 121 so as to be parallel to the body hinge shaft 110.

The second mounting portion 121 includes an upper door bracket 123 and a lower door bracket 125.

The upper door bracket 123 is connected to the gooseneck hinge 130 positioned on an upper portion of the door hinge shaft 120 and is mounted on the door 20.

The lower door bracket 125 is connected to the gooseneck hinge 130 positioned on a lower portion of the door hinge shaft 120 and is mounted on the door 20.

That is, a pair of gooseneck hinges 130 may connect upper and lower portions of the body hinge shaft no and the door hinge shaft 120.

The pair of the gooseneck hinges 130 is respectively disposed in the longitudinal direction of the vehicle body 1.

That is, the pair of gooseneck hinges 130 connects the body hinge shaft no and the door hinge shaft 120 to open and close the door 20.

The pair of gooseneck hinges 130 may be formed in a convexly rounded shape toward the inside of a vehicle compartment.

Meanwhile, in the present embodiment, the drive motor 140 is mounted on the body hinge shaft 110.

The drive motor 140 may selectively open and close the door 20 by rotating the body hinge shaft 110.

Such a drive motor 140 is connected to the lower body bracket 115.

The drive motor 140 may swing and slide the door 20 by a pair of the gooseneck hinge 130 and the door hinge shaft 120 connected to the body hinge shaft no by selectively rotating the body hinge shaft no.

Therefore, the door mounting unit 100 for the vehicle according to the exemplary embodiments of the present invention may open and close the door 20 in a swing and sliding manner, thereby securing a dwelling ability of a passenger.

In addition, the door mounting unit 100 for the vehicle may prevent a user's head from contacting the door mounting unit 100 in advance due to a structure of the pair of gooseneck hinges 130 when a user gets on and off the vehicle, thereby preventing safety accidents, and improving convenience and marketability.

In addition, the door mounting unit 100 for the vehicle according to the exemplary embodiments of the present invention may form a double pillar structure by the body hinge shaft no disposed in the height direction of the vehicle body 1 along the front pillar 5 or the rear pillar 7, thereby improving framework performance of the vehicle body 1 against ceiling strength, side collision ability, torsion rigidity, etc.

Although the present invention has been described above with reference to the preferred embodiments of the present invention, those of ordinary skill in the art will understand that various modifications and changes can be made to the present invention without departing from the spirit and scope of the present invention as set forth in the claims below.

What is claimed is:

1. A door mounting unit for a vehicle, the door mounting unit comprising:
    a body hinge shaft; and
    first mounting portions disposed at both ends of the body hinge shaft, wherein the body hinge shaft is configured to be elongated in a door opening of a vehicle body along a pillar in a height direction of the vehicle body and is configured to be mounted on the vehicle body by the first mounting portions;
    wherein each of the first mounting portions comprises:
        an upper body bracket fitted into an upper end of the body hinge shaft, and configured to be mounted on the vehicle body and to rotatably support the body hinge shaft; and
        a lower body bracket fitted into a lower end of the body hinge shaft, and configured to be mounted on the vehicle body and to rotatably support the body hinge shaft together with the upper body bracket; and
    wherein the upper body bracket comprises:
        a cap portion fitted into the body hinge shaft; and
        a plate portion integrally formed and extending from the cap portion toward the vehicle body and configured to be mounted on an upper edge side of the vehicle body.

2. The door mounting unit of claim 1, wherein the body hinge shaft is configured to be disposed on a front side of the door opening with respect to an opening direction of a door of the vehicle.

3. The door mounting unit of claim 1, wherein a first side of the plate portion integrally formed and extending from the cap portion is configured to be mounted on a roof rail module, and a second side integrally formed and extending from the cap portion is configured to be mounted on a roof rail side.

4. The door mounting unit of claim 1, wherein the lower body bracket is configured to be fastened to a side inner panel overlapping a side outer panel to form a closed cross-section, and to a pillar inner joint configured to overlap the side inner panel.

5. The door mounting unit of claim 1, further comprising a drive motor mounted on the body hinge shaft and configured to selectively rotate the body hinge shaft and to open and close a door of the vehicle.

6. The door mounting unit of claim 5, wherein the drive motor is connected to the lower body bracket.

7. A door mounting unit for a vehicle, the door mounting unit comprising:
    a body hinge shaft;
    first mounting portions disposed at both ends of the body hinge shaft, wherein the body hinge shaft is configured to be elongated in a door opening of a vehicle body along a pillar in a height direction of the vehicle body and configured to be mounted on the vehicle body by the first mounting portions; and
    a door hinge shaft configured to be disposed at a position spaced apart from the body hinge shaft by a predetermined distance and configured to be mounted to a door of the vehicle in the height direction of the vehicle body by a second mounting portion such that the door hinge shaft is parallel to the body hinge shaft;
    wherein each of the first mounting portions comprises:
        an upper body bracket fitted into an upper end of the body hinge shaft, and configured to be mounted on the vehicle body and to rotatably support the body hinge shaft; and
        a lower body bracket fitted into a lower end of the body hinge shaft, and configured to be mounted on the vehicle body and to rotatably support the body hinge shaft together with the upper body bracket; and
    wherein the upper body bracket comprises:
        a cap portion fitted into the body hinge shaft; and
        a plate portion integrally formed and extending from the cap portion toward the vehicle body and configured to be mounted on an upper edge side of the vehicle body.

8. The door mounting unit of claim 7, further comprising a pair of gooseneck hinges mounted on upper and lower portions of the body hinge shaft and the door hinge shaft, respectively, in a longitudinal direction of the vehicle body and configured to connect the body hinge shaft and the door hinge shaft to open and close the door of the vehicle.

9. The door mounting unit of claim 8, wherein the second mounting portion comprises:
    an upper door bracket connected to the gooseneck hinge of the pair of gooseneck hinges that is mounted on the upper portion of the door hinge shaft, wherein the upper door bracket is configured to be mounted on the door of the vehicle; and
    a lower door bracket connected to the gooseneck hinge of the pair of gooseneck hinges that is mounted on the lower portion of the door hinge shaft, wherein the lower door bracket is configured to be mounted on the door of the vehicle.

10. The door mounting unit for the vehicle of claim 8, wherein each of the pair of gooseneck hinges is formed in a convexly rounded shape toward an inside of a vehicle compartment.

11. A vehicle comprising:
    a vehicle body including a door opening;
    a side outer panel;
    a side inner panel overlapping the side outer panel;
    a door mounted in the door opening;
    a pillar extending in a height direction of the vehicle body;

a body hinge shaft elongated in the door opening of the vehicle body along the pillar in the height direction of the vehicle body; and first mounting portions disposed at both ends of the body hinge shaft, wherein the body hinge shaft is mounted on the vehicle body by the first mounting portions;

wherein each of the first mounting portions comprises:
an upper body bracket fitted into an upper end of the body hinge shaft and mounted on the vehicle body to rotatably support the body hinge shaft; and
a lower body bracket fitted into a lower end of the body hinge shaft and mounted on the vehicle body to rotatably support the body hinge shaft together with the upper body bracket; and wherein the upper body bracket comprises:
a cap portion fitted into the body hinge shaft; and
a plate portion integrally formed and extending from the cap portion toward the vehicle body and mounted on an upper edge side of the vehicle body.

12. The vehicle of claim 11, wherein the body hinge shaft is disposed on a front side of the door opening with respect to an opening direction of the door.

13. The vehicle of claim 11, further comprising a roof rail module and a roof rail side, wherein a first side of the plate portion integrally formed and extending from the cap portion is mounted on the roof rail module, and a second side of the plate portion integrally formed and extending from the cap portion is mounted on the roof rail side.

14. The vehicle of claim 11, further comprising a pillar inner joint overlapping the side inner panel, wherein the lower body bracket is fastened to the side inner panel overlapping the side outer panel to form a closed cross-section and to the pillar inner joint overlapping the side inner panel.

15. The vehicle of claim 14, further comprising a drive motor mounted on the body hinge shaft and configured to selectively rotate the body hinge shaft and to open and close the door of the vehicle.

16. The vehicle of claim 11, further comprising:
a door hinge shaft disposed at a position spaced apart from the body hinge shaft by a predetermined distance; and
a second mounting portion, wherein the door hinge shaft is mounted to the door of the vehicle in the height direction of the vehicle body by the second mounting portion such that the door hinge shaft is parallel to the body hinge shaft.

17. The door mounting unit of claim 7, wherein the body hinge shaft is configured to be disposed on a front side of the door opening with respect to an opening direction of a door of the vehicle.

18. The door mounting unit of claim 7, wherein a first side of the plate portion integrally formed and extending from the cap portion is configured to be mounted on a roof rail module, and a second side integrally formed and extending from the cap portion is configured to be mounted on a roof rail side.

19. The door mounting unit of claim 7, wherein the lower body bracket is configured to be fastened to a side inner panel overlapping a side outer panel to form a closed cross-section, and to a pillar inner joint configured to overlap the side inner panel.

20. The door mounting unit of claim 7, further comprising a drive motor mounted on the body hinge shaft and configured to selectively rotate the body hinge shaft and to open and close a door of the vehicle.

* * * * *